United States Patent [19]
Yahara

[11] Patent Number: 5,926,256
[45] Date of Patent: Jul. 20, 1999

[54] IMAGE RECORDING APPARATUS

[75] Inventor: Masashi Yahara, Yokohama, Japan

[73] Assignee: Canon Kabushiki Kaisha, Tokyo, Japan

[21] Appl. No.: 08/795,778

[22] Filed: Feb. 5, 1997

[30] Foreign Application Priority Data

Feb. 7, 1996 [JP] Japan ................................ 8-046647

[51] Int. Cl.$^6$ .............................. G03B 27/32; G03B 27/52
[52] U.S. Cl. ................................................ 355/64; 355/40
[58] Field of Search ................................. 355/18, 23, 40, 355/44, 64, 46, 72, 41, 42, 43; 348/64; 396/446, 322, 333, 429; 369/14, 15, 69, 70, 84, 85; 360/92, 94

[56] References Cited

U.S. PATENT DOCUMENTS

| | | | |
|---|---|---|---|
| 5,068,745 | 11/1991 | Shimura | 358/403 |
| 5,132,808 | 7/1992 | Higuchi et al. | 358/403 |
| 5,208,627 | 5/1993 | Yoshihara et al. | 355/23 |
| 5,430,276 | 7/1995 | Ohtani et al. | 235/375 |
| 5,499,113 | 3/1996 | Tsuboi et al. | 358/479 |
| 5,550,639 | 8/1996 | Sugita | 358/302 |
| 5,576,839 | 11/1996 | Morimoto et al. | 386/113 |
| 5,617,179 | 4/1997 | Yoshihara | 355/40 |
| 5,640,203 | 6/1997 | Wakui | 348/231 |
| 5,708,472 | 1/1998 | Morisawa et al. | 348/373 |
| 5,717,442 | 2/1998 | Murata et al. | 346/49 |

*Primary Examiner*—Safet Metjahic
*Assistant Examiner*—Hung Henry Nguyen
*Attorney, Agent, or Firm*—Fitzpatrick, Cella, Harper & Scinto

[57] ABSTRACT

An image recording apparatus includes a first recording device for recording an image of an original on a first recording medium, wherein identification information is imparted to the first recording medium, a second recording device for recording the image of the original on a second recording medium, wherein identification information is imparted to the second recording medium, a holder for removably holding the first recording medium and the second recording medium on a body of the apparatus, and a memory for storing a combination of the identification information of the first recording medium and the second recording medium, on which a related image is to be recorded.

32 Claims, 19 Drawing Sheets

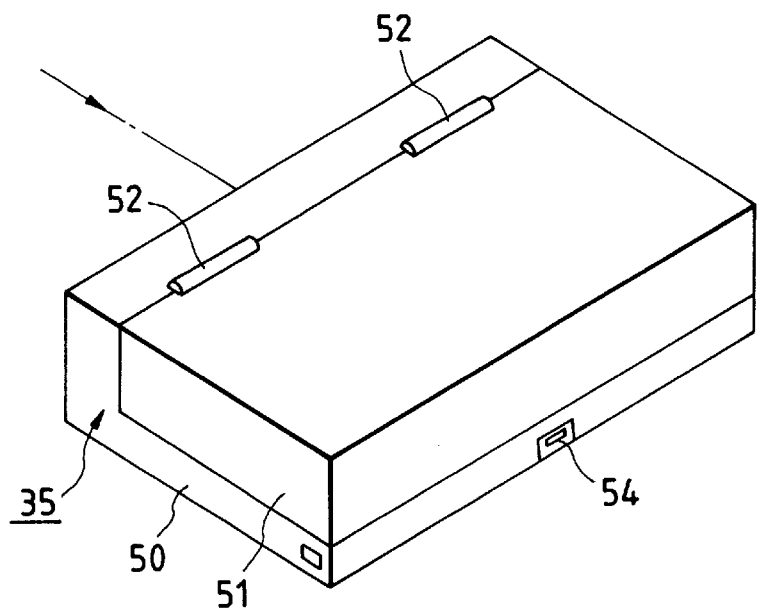
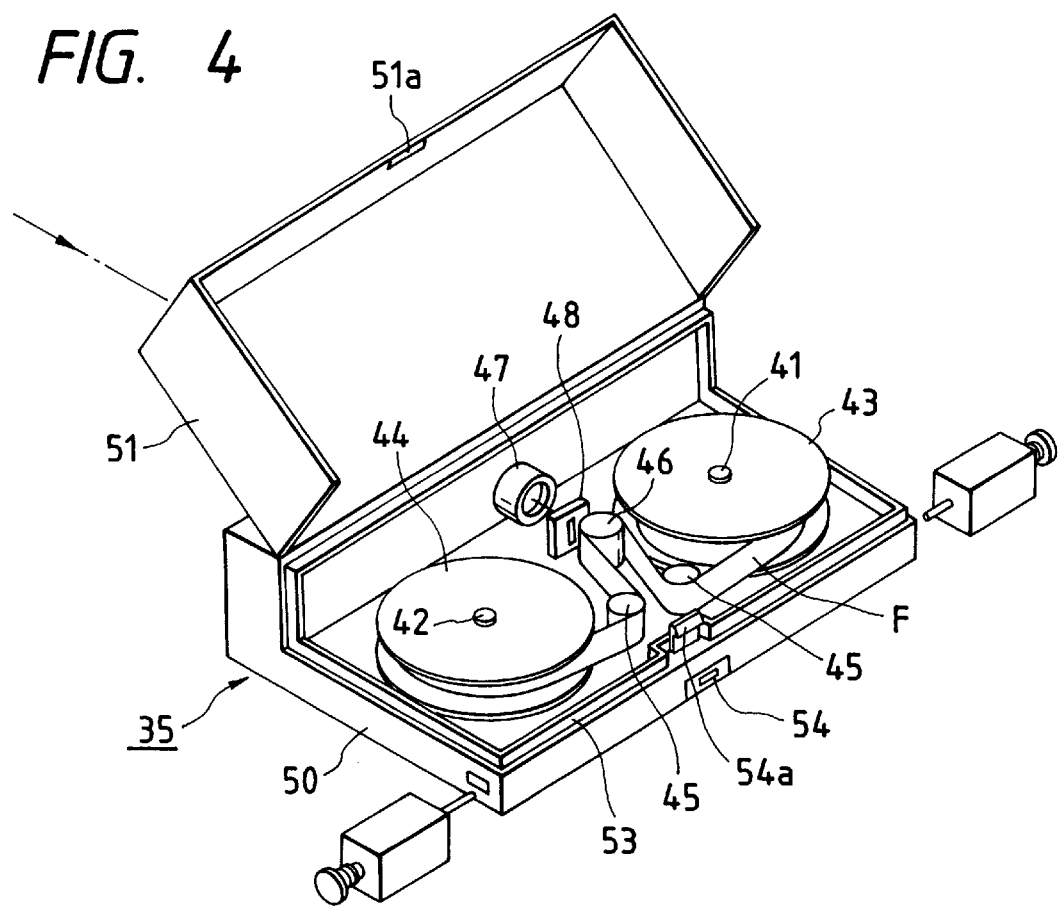

FIG. 11

| | MICROFILM F | PHOTOMAGNETIC DISK 81 | |
|---|---|---|---|
| COMBINATION 1 | FILM NO. 1 | DISK NO. 1 | |
| COMBINATION 2 | FILM NO. 2 | DISK NO. 3 | |
| COMBINATION 3 | FILM NO. 3 | DISK NO. 6 | |

FIG. 13

| | MICROFILM F | | |
|---|---|---|---|
| PHOTOMAGNETIC DISK 81 | FILM NO. 1, FILM NO. 2 | FILM NO. 3, FILM NO. 4 | FILM NO. 5, FILM NO. 6 |
| | DISK NO. 1 | DISK NO. 3 | DISK NO. 6 |
| | COMBINATION 1 | COMBINATION 2 | COMBINATION 3 |

FIG. 16

| | CAMERA UNIT 35 (MICROFILM F) | PHOTOMAGNETIC DISK 81 |
|---|---|---|
| COMBINATION 1 | CAMERA UNIT ID 1 | DISK NO. 2 |
| COMBINATION 2 | CAMERA UNIT ID 2 | DISK NO. 5 |
| COMBINATION 3 | CAMERA UNIT ID 3 | DISK NO. 7 |

FIG. 18

| | CAMERA UNIT 35 (MICROFILM F) | PHOTOMAGNETIC DISK 81 |
|---|---|---|
| COMBINATION 1 | CAMERA UNIT ID 1, CAMERA UNIT ID 2 | DISK NO. 2 |
| COMBINATION 2 | CAMERA UNIT ID 3, CAMERA UNIT ID 4 | DISK NO. 5 |
| COMBINATION 3 | CAMERA UNIT ID 5, CAMERA UNIT ID 6 | DISK NO. 7 |

IMAGE RECORDING APPARATUS

BACKGROUND OF THE INVENTION

1. Field of the Invention

This invention relates to an image recording apparatus having both of the function of recording the image of an object (an original) on a first recording medium such as a lengthy microfilm (camera function) and the function of electrically recording the image of the object (original) on a second recording medium such as a photomagnetic disk (electronic file system).

2. Related Background Art a) A microfilm camera is mentioned as an example of the image recording apparatus.

The microfilm camera is an automatic photographing apparatus which conveys materials to be microfilmed and preserved, for example, bills, checks, stock certificates, documents, drawings, etc., in succession to a photographing position, imprints the images of those materials in succession onto a lengthy microfilm, and discharges the photographed materials out of the apparatus.

The images photographed on the microfilm are excellent in long-term preservability, image quality and proving ability, and the microfilm camera is characterized by its high-speed photographing performance.

b) As another example of the image recording apparatus, there may be mentioned an electronic file which reads the image of an object by a photoelectric conversion element and converts it into an electrical signal, and makes it into a digital signal and records it on a photomagnetic disc.

The electronic file also records materials such as documents and drawings in succession on a recording medium, but does not require development as in the case of microfilm and therefore, it has the promptitude of image reproduction after recording, and is excellent in searching and editing performance.

c) So, there has been devised an image recording apparatus having both of the camera function of item a) above and the electronic file function of item b) above.

The present invention relates to an image recording apparatus having both of the camera function and the electronic file function of item c) above.

In the image recording apparatus having both of the camera function and the electronic file function, when the image of an object is to be recorded on both of a photographic recording medium such as microfilm and a digital recording medium such as a photomagnetic disk at the time, usually the digital recording medium having immediate recording reproducibility is used as the object of ordinary search and editing and the microfilm having high long-term preservability is used for the preservation (back-up) of the object image.

When the photographic recording medium such as microfilm is thus used for the preservation, it is necessary that the images of all objects be reliably photographed on the microfilm, but in the image recording apparatus according to the prior art, image recording only on the microfilm or only digital recording is also possible and therefore, it has not been ensured that the images will be reliably photographed on the microfilm at one time.

Also, in an image recording apparatus which permits a photographic recording medium or a digital recording medium to be freely dismounted for interchange, there has been the problem that wrong image recording is effected in a combination with a recording medium other than a combination particularly used for preservation and the microfilm does not provide a reliable preserving medium for images.

Further, taking a photomagnetic disk as an example of the digital recording medium, the image recording capacity (the number of recordable frames of images) of a photomagnetic disk and that of a roll of microfilm often differs greatly from each other. When, for example, the photographing reduction rate is small, it happens that images to be photographed on several rolls of microfilm can be recorded on a photomagnetic disk, and in the case of photographing in which the reduction rate is great, it happens that images to be photographed on a roll of microfilm are recorded on several photomagnetic disks, and this has led to the problem that the combination of recording mediums becomes more complicated and cumbersome.

SUMMARY OF THE INVENTION

The present invention has as its object to provide an image recording apparatus having both of the camera function and the electronic file function, which can always effect reliable image recording and image preservation photographing.

The present invention provides an image recording apparatus provided with first recording means for recording the image of an original on a first recording medium, and second recording means for reading the image of the original as an electrical signal by a photoelectric conversion element and recording it on a second recording medium, characterized in that the first recording medium and the second recording medium on which the image of the original is recorded are related to each other.

The present invention also provides an image recording apparatus provided with first recording means for recording the image of an original on a first recording medium, second recording means for recording the image of the original on a second recording medium, means for dismountably holding the first recording medium with respect to the apparatus, means for dismountably holding the second recording medium with respect to the apparatus, and means for relating the first recording medium and the second recording medium on which the same original is to be recorded to each other.

The present invention is an image recording apparatus provided with at least two kinds of recording means in which the combination of a first recording medium such as microfilm and a second recording medium for digital recording is specified and when there is a combination differing from the specified combination or a partner to be combined does not exist, the recording of an image is prohibited, whereby reliable image recording and image preservation photographing (back-up) can always be accomplished.

That is, the first recording medium and the second recording medium are related to each other and combined so as to correspond to each other, and any other combination than this is eliminated, whereby an image recorded on the first recording medium and an image recorded on the second recording medium can be made completely coincident with each other and therefore, a preserving medium by the photographing medium can be reliably prepared.

Particularly, when the photographing reduction rate of the photographing on the recording medium is small or great and when the image recording capacity (the number of recordable frames of images) of a digital recording medium and that of a photographing medium differ greatly from each other, photographing and recording can be effected without the combination of the mediums becoming cumbersome or being mistaken even when several photographing mediums correspond to a digital recording medium or conversely, several digital recording mediums correspond to a photographing medium.

BRIEF DESCRIPTION OF THE DRAWINGS

FIG. 3 is a pictorial perspective view of a camera unit.

FIG. 4 is a perspective view showing the interior of the camera unit with the lid member thereof opened.

FIG. 11 shows examples of the combination of a photomagnetic disk and microfilm.

FIG. 13 shows other examples of the combination of the photomagnetic disk and microfilm.

FIG. 16 shows examples of the combination of a photomagnetic disk and a camera unit (microfilm).

FIG. 18 shows other examples of the combination of the photomagnetic disk and the camera unit (microfilm).

DESCRIPTION OF THE PREFERRED EMBODIMENTS

Figure 1:
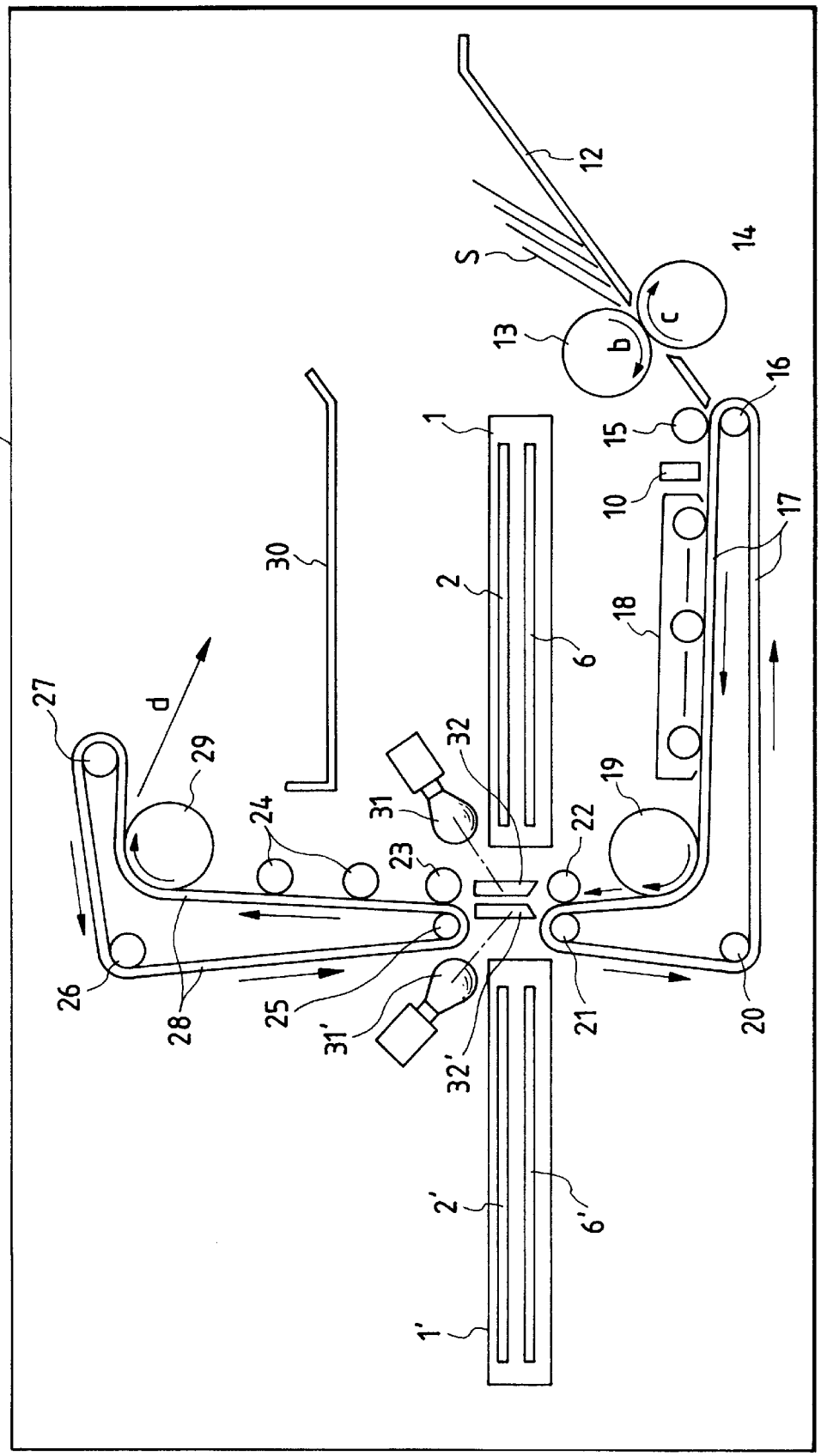
FIG. 1 schematically shows the construction of an image recording apparatus according to a first embodiment of the present invention.

The present invention will hereinafter be described with respect to some specific embodiments thereof shown in the drawings.

First Embodiment (FIGS. 1 to 13)

a) Object Conveying System

In FIG. 1, sheet-like objects (originals) S placed on the original supporting plate 12 of the paper supplying portion of an image recording apparatus body 11 are separated one by one and fed by a paper feeding roller 13 rotated in the direction of arrow b and a separating roller 14 rotated in the direction of arrow c.

An upstream side conveying belt 17 is passed over belt rollers 16 and 21 and holds suitable tension by a tension roller 20 and is moved round by the rotation of an upstream side drive roller 19, and the objects S fed one by one are conveyed by this upstream side conveying belt 17 moved around. An idler roller 15 and a guide unit 18 serve to urge the object S against the upstream side belt 17. The reference numeral 10 designates an object sensor which detects the object S being conveyed and which is used for the counting of recorded sheets and the preparation of timing.

The object S is conveyed from a horizontal direction to a vertical direction by the upstream side belt 17 and passes upwardly through the gap path between two object guide glass plates 32 and 32' as an exposure portion and during this passage, the object S has its both surfaces illuminated at are time by a pair of illuminating lamps 31 and 31'. Nip rollers 22 and 23 are provided below and above the guide glass plates 32 and 32'.

A downstream side conveying belt 28 is passed over belt rollers 25 and 27 and holds suitable tension by a tension roller 26, and is moved by the rotation of a downstream side drive roller 29, and the object S having passed between the guide glass plates 32 and 32' is conveyed in a vertical direction by this downstream side conveying belt 28 moved around, and then has its conveyance route changed to a horizontal direction and travels in the direction of arrow d and is discharged to a stacker 30. An idler roller 24 serves to urge the object S against the downstream side conveying belt 28.

b) Optical System

On the opposite sides of the object guide glass plates 32 and 32' which are the exposure portion, a pair of first mirrors 1 and 1' forming an angle of 45° at the right and left with respect to the plane of the object S moved in a vertical direction between the guide glass plates 32 and 32' are disposed at symmetrical positions. These first mirrors 1 and 1' are supported by a base structure, not shown, in the image recording apparatus body 11 similar to the roller shafts of the aforedescribed object conveying system.

Figure 2:
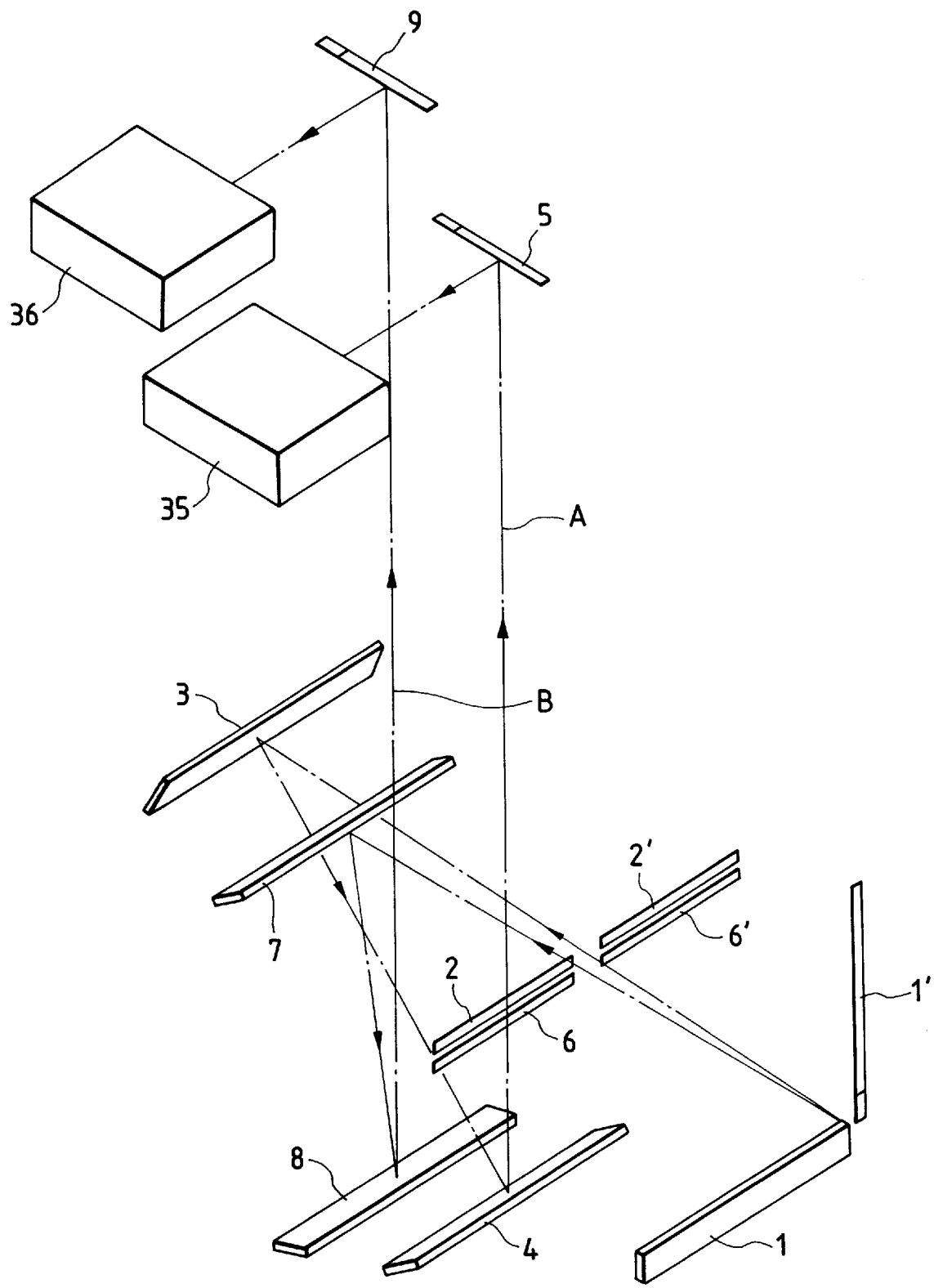
FIG. 2 is a perspective view showing the mirror construction of the optical system of the apparatus of FIG. 1.

The images on both surfaces of the object S illuminated in the exposure portions 32, 32' by the pair of illuminating lamps 31 and 31' are reflected by the first mirrors 1 and 1', respectively, and as shown in FIG. 2, are directed to a camera portion 35 as photographing means (first recording means) for photographing the image information on microfilm (a first recording medium) as a photographing medium through a first optical system A, and also are directed to the image pickup portion (photoelectric conversion element) 36 of recording means (second recording means) for reading the images as an electrical signal and digitally recording it on a photomagnetic disc (a second recording medium) as a recording medium through a second optical system B.

(1) First Optical System A and Camera Portion 35 (Camera Function)

The first optical system A has slits 2, 2', a second mirror 3, a third mirror 4 and a fourth mirror 5, and the images on both surfaces of the object S reflected in the exposure portion 32, 32' by the first mirrors 1 and 1' pass through the slits 2 and 2', respectively, and the images having passed are obliquely downwardly reflected by the second mirror 3. These images are again upwardly reflected by the third mirror 4 and are forwardly reflected by the fourth mirror 5, and the images reflected by this fourth mirror 5 enter the camera portion 35.

Figure 5:
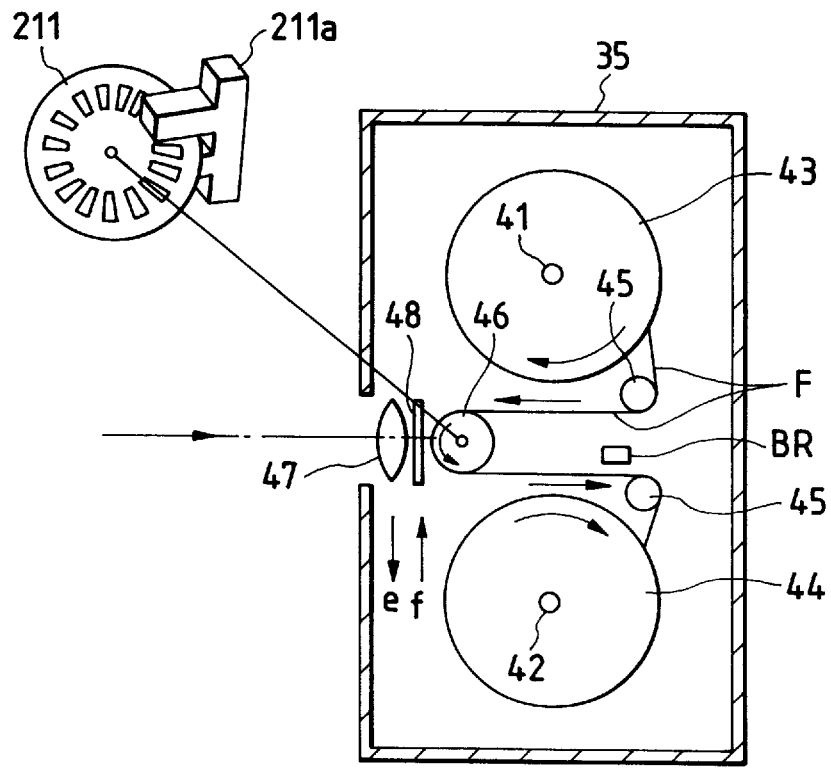
FIG. 5 is a schematic plan view of the interior of the camera unit.

The camera portion 35 in the present embodiment is a camera unit removably mountable on a predetermined region of the image recording apparatus body 11. FIG. 3 is a pictorial perspective view of the camera unit 35, FIG. 4 is a perspective view showing the interior of the camera unit 35 with the lid member 51 thereof opened, and FIG. 5 is a schematic plan view of the interior of the camera unit 35.

In the camera unit 35, reference numeral 50 designates a film containing portion, and reference numeral 51 denotes a light intercepting lid member operable to be opened and closed about hinge portions 52 and 52 relative to the film containing portion 50. When the lid member 51 is closed relative to the film containing portion 50, the restraining projection 51a of the lid member 51 side is caught by the book portion 54a of the film containing portion 50 side, whereby the lid member stops being opened. A light intercepting wall portion 53 matching the shape of the lid member is provided on the marginal edge of the opening portion of the film containing portion 50 so that no light may enter from between the film containing portion 50 and the lid member 51 with the lid member 51 closed relative to the film containing portion 50.

The book portion 54a of the film containing portion 50 side is provided on a lid member liberating lever portion 54 provided on the film containing portion 50 side, and by this lever portion 54 being pushed against the restitutive resiliency thereof, the book portion 54a escapes from the restraining projection 51a and the stoppage of the opening of the lid member 51 is released.

The film containing portion 50 is provided with an imaging lens 47, a shutter 48, a capstan roller 46, guide rollers 45, 45, a film pay-away side shaft 41, a film take-up side shaft 42, a bar-code reader BR, etc.

A supply reel 43 for a roll of microfilm F is mounted on the film pay-away side shaft 41, and the leading end side of the film F, as shown in FIGS. 4 and 5, is wound and restrained on the core portion of a take-up reel 44 mounted on the film take-up side shaft 42, by way of a guide roller 45, the capstan roller 46 and the guide roller 45, to thereby effect the loading of the film F, and the lid member 51 is closed relative to the film containing portion 50.

By the camera unit 35 being mounted on the predetermined region of the image recording apparatus body 11, the capstan roller 46 becomes connected to the drive system, not shown, of the image recording apparatus body 11 side through a capstan clutch, not shown.

The capstan clutch is connected and controlled in a timed relationship with the object S coming to the exposure portion 32, 32' and the capstan roller 46 is rotatively driven in a predetermined manner, whereby the film F is transferred from the supply reel 43 on which unexposed film is wound to the take-up reel 44 at a predetermined speed.

Forwardly of the capstan roller 46, there is a shutter 48 connected to a solenoid, not shown, and this shutter is moved in the direction of arrow e or f in FIG. 5, whereby the image of the object can be photographed on the film F or projected light can be intercepted.

A film encoder 211 (FIG. 5) as means for measuring the amount of conveyance (the amount of transfer) of the film F is connected to the capstan roller 46, and a pulse conforming to the amount of conveyance of the film F is generated from the sensor 211a of this encoder 211 and is inputted to the means for measuring the amount of conveyance of the film.

The microfilm in the camera unit 35 is interchangeable and for example, a film number as information for discriminating between rolls of microfilm is attached to the leading end portion of each roll of microfilm loaded. This film number is converted into a bar code and printed on a seal, which is stuck on the leading end of the film. When a roll of microfilm is loaded into the camera unit, the bar code attached to this film is automatically read by the bar-code reader BR and this bar-code data is transmitted to the apparatus body 1.

By recording the bar-code data, the apparatus body can discriminate the number inherent to the film loaded in the camera unit.

Thus, the images on both surfaces of the object S directed to the camera portion 35 through the first optical system A are photographed on a reduced scale on the microfilm F as a photographing medium on the capstan roller 46 by the imaging lens 47.

(2) Second Optical System B and Photomagnetic Disk Device (Electronic File Function)

The second optical system B has slits 6, 6', a fifth mirror 7, a sixth mirror 8 and a seventh mirror 9, and the images on both surfaces of the object S reflected by the first mirrors 1 and 1' pass through the slits 6 and 6', respectively, and the images having passed are obliquely downwardly reflected by the fifth mirror 7. These images are again upwardly reflected by the sixth mirror 8, whereafter they are forwardly reflected by the seventh mirror 9, and the images reflected by this seventh mirror 9 are directed to the image pickup portion 36.

The image pickup portion 36 includes an imaging lens and a photoelectric conversion element array, and photoelectrically picks up the images on both surfaces of the object S as a time-serial electrical digital pixel signal, and the read image information is recorded on a photomagnetic disk as a digital recording medium by a photomagnetic disc device.

Figure 6:
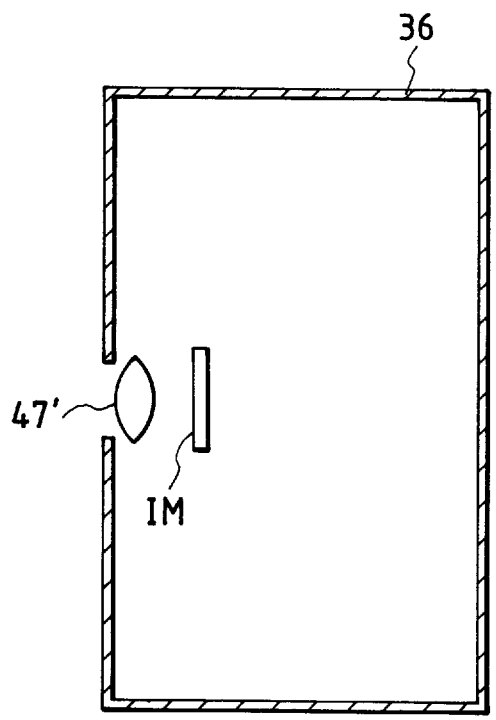
FIG. 6 is a schematic cross-sectional view of an image reading portion.

FIG. 6 shows the image pickup portion 36 which effects electrical signal conversion. The second optical system B is imaged on a photoelectric conversion element PL-IM such as a CCD by a projection lens 47' and the object image is converted into an electrical signal.

Although not shown, the image pickup portion 36 has an electrically connected portion with a photomagnetic disk device 82, and the signal obtained by electrically converting the object image is transmitted to and recorded on a recording medium such as a photomagnetic disk in the disk device 82.

Figure 7:
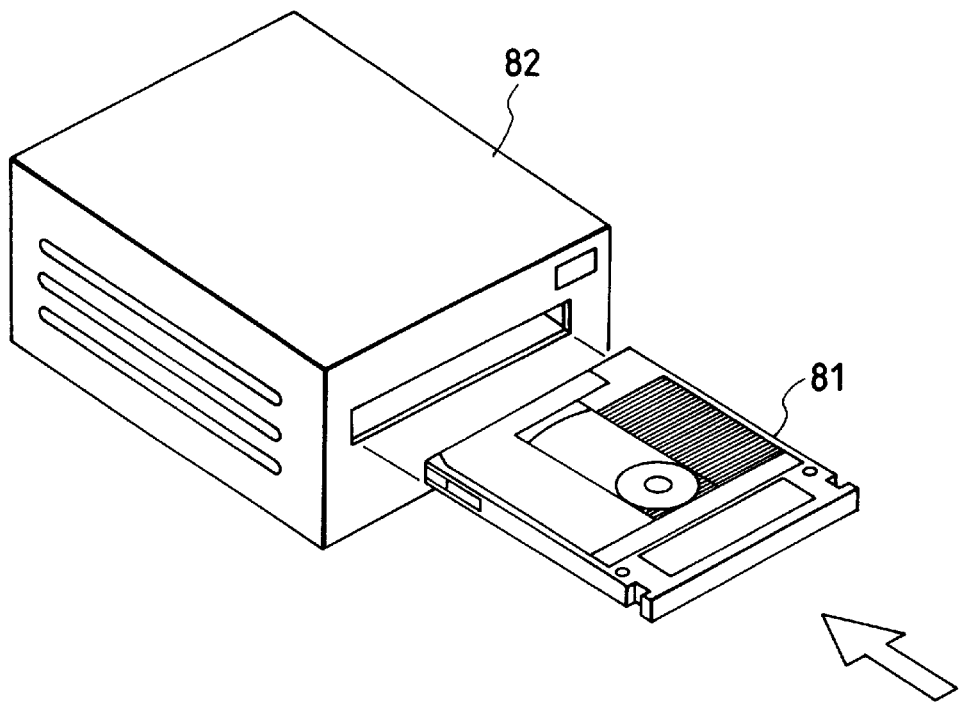
FIG. 7 is a pictorial perspective view of a photomagnetic disk device.

FIG. 7 is a pictorial perspective view of the photomagnetic disk device (photomagnetic disk drive) 82, and this device 82 is electrically connected to the image recording apparatus body 11 and the image pickup portion 36, and is constructed as a device discrete from the image recording apparatus body 11. The reference numeral 81 designates a photomagnetic disk as a digital recording medium removably mountable on the photomagnetic disk device 82.

For example, a disk number as information for discriminating between disks is stored in the photomagnetic disc used. When a photomagnetic disk is loaded into the disk device 82, the disk number stored in this disk is transmitted to the apparatus body 11.

Figure 8:
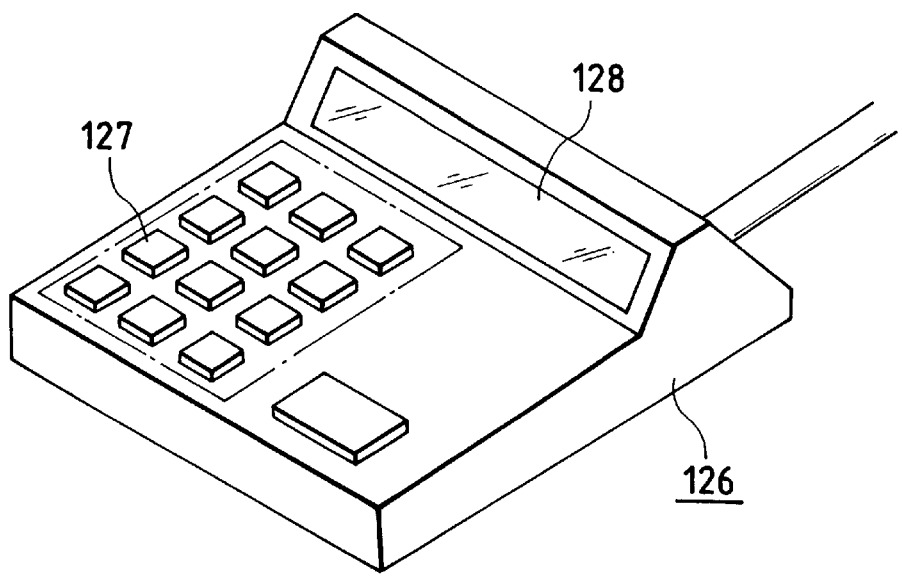
FIG. 8 is a perspective view of a control portion.

FIG. 8 is a perspective view of a control portion 126 for operating and controlling the image recording apparatus body 11. This control portion 126 is comprised of a keyboard 127 and a display 128, and is electrically coupled to the CPU of the image recording apparatus body 11, and controls the image recording apparatus body 11, the camera unit 35, the pickup portion 36 and the disk device 82 by the key operation of the keyboard 127 through the CPU.

c) Process Flow of the Object Image

Figure 9:
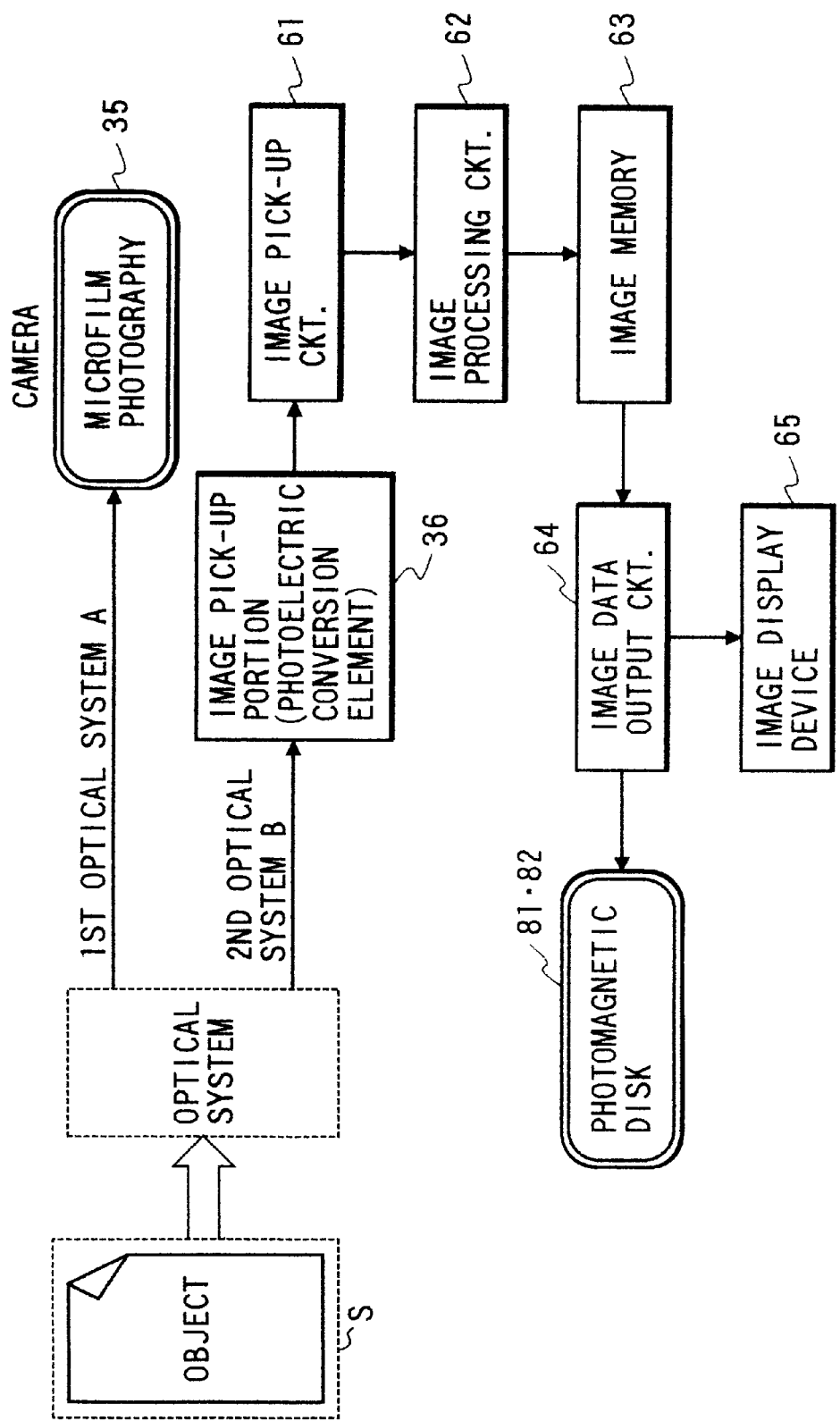
FIG. 9 is a block diagram of the process flow of object image information.

FIG. 9 shows the process flow of the above-described object image by blocks.

That is, the image of the object S conveyed through the exposure portion 32, 32' enters the camera portion 35 through the first optical system A and is photographically recorded on the microfilm F (camera function).

Also, the image of the object S conveyed through the exposure portion 32, 32' enters the image pickup portion 36 through the second optical system B, and is converted into an electrical signal by the photoelectric conversion element and is inputted to an image pickup circuit 61. The electrical signal is amplified there, whereafter it is image processed by an image processing circuit 62, and then is temporarily preserved in an image memory 63. The image data preserved in the image memory 63 is sent to the photomagnetic disk device 82 via an image data output circuit 64 and is recorded on the photomagnetic disk 81. Also, the image is sent from the image data output circuit 64 to an image display device (such as a CRT, a liquid crystal display or the like) 65 and is displayed.

(2) Control Circuit

Figure 10:
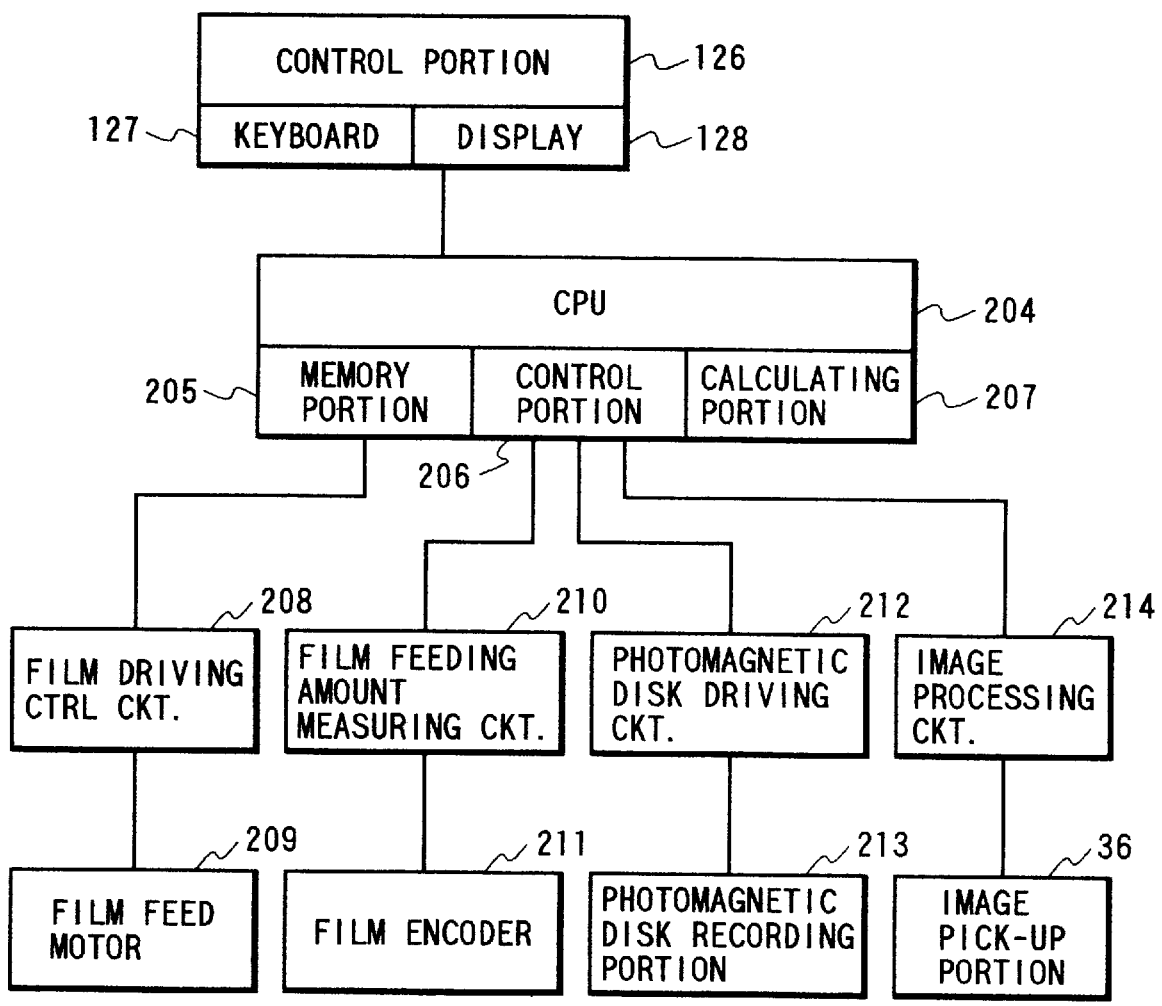
FIG. 10 is a block diagram of a control circuit.

FIG. 10 is a block diagram of a control circuit for operating the image recording apparatus body 11.

The control portion 126 (FIG. 8) having the keyboard 127 and the display 128 is connected to the CPU 204 in the image recording apparatus body 11.

The CPU 204 is comprised of a memory portion 205, a control portion 206 and a calculating portion 207.

The CPU 204 is connected to a film driving control circuit 208 and a film feeding amount measuring circuit 210 in the camera unit 35 and to a photomagnetic disk driving circuit 212 and an image processing circuit 214 in the disk device 82, and is further connected to a film driving motor 209, a film encoder 211 (FIG. 5), a photomagnetic disk recording portion 213 and the image pickup portion 36 (FIG. 2) having the photoelectric conversion element through these circuits.

(3) Correlation of microfilm F to Photomagnetic Disk 81

In the present embodiment, there is shown an example in which when in the image recording apparatus body 11, the same image is to be photographed and recorded on the microfilm F as a recording medium in the camera function and on the photomagnetic disk 81 as a digital recording medium in the electronic file function, the combination of the microfilm F used and the photomagnetic disk 81 is set.

FIG. 11 shows examples of the combination. The photomagnetic disk 81 has disk numbers 1, 3 and 6 attached thereto. There are three rolls of microfilm F having attached thereto film Nos. 1, 2 and 3 in the order of photographing.

As can be seen from FIG. 11, as combination 1, the same original is recorded without fail on disk number 1 and film No. 1, and likewise, disk number 3 and film No. 2, and disk number 6 and film No. 3 correspond to each other as combinations.

These combinations of the corresponding numbers of the microfilm and photomagnetic disk on which the same original is to be recorded are stored in advance as corresponding data in the memory portion 205 of the apparatus body. These corresponding data can be stored in the memory portion 205 by operating the keyboard 127. The modification and changing of the data are also effected by the operation of the keyboard.

Figure 12:
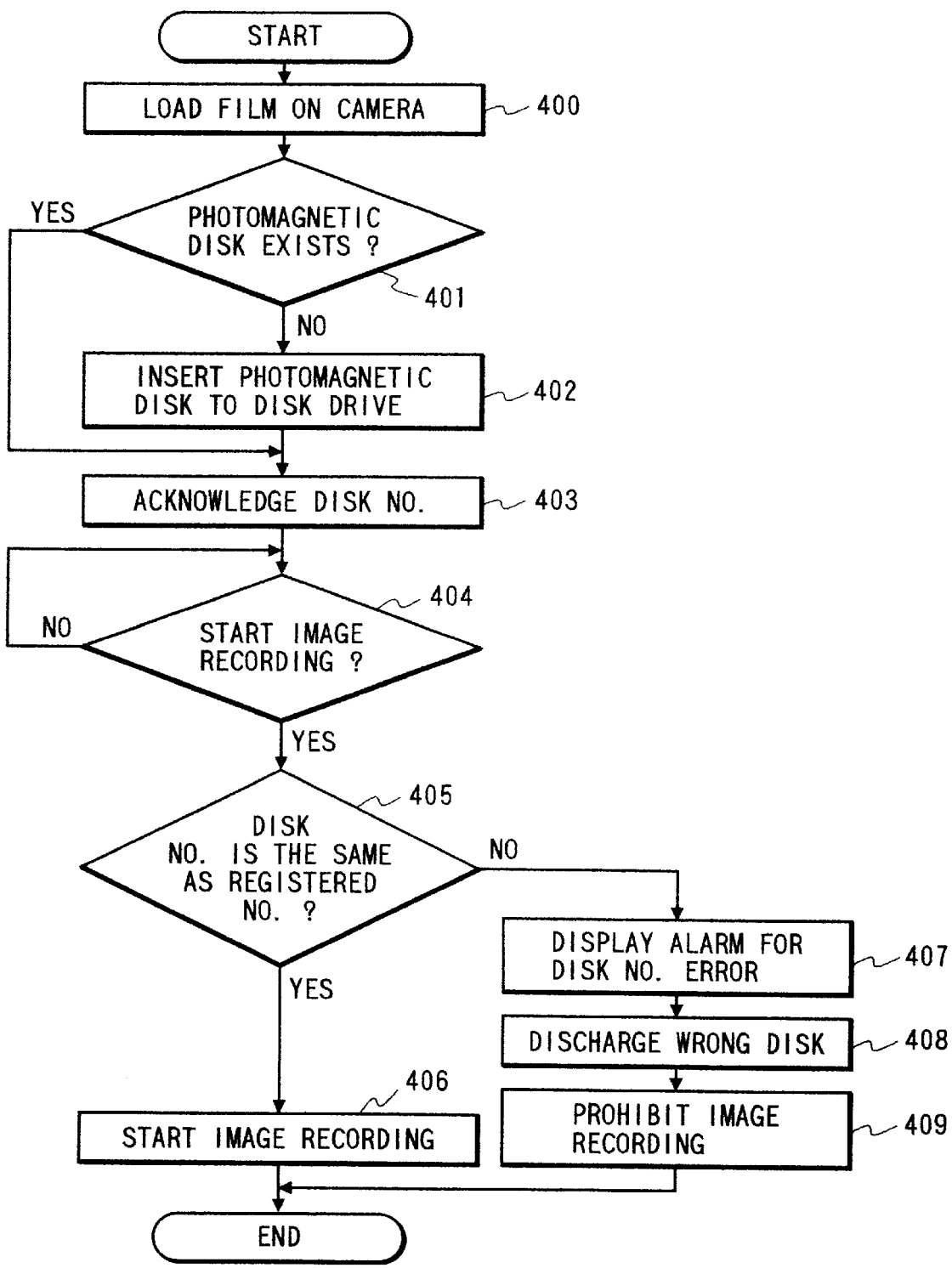
FIG. 12 is a control flow chart.

In the case of the combinations as shown in FIG. 11, an example of the control when photographing and recording are effected on the microfilm F and the photomagnetic disk 81 at one time will now be described with reference to the flow chart of FIG. 12. In this embodiment, a design is made such that whether the loaded disk is in a correct combination with the loaded microfilm is judged to thereby execute or discontinue recording.

First, at a step 400, microfilm F of film No. 1 is loaded onto the camera portion 35. The number of this film F is read by the bar-code reader BR and is transmitted to the apparatus body 11, which acknowledges the film number.

At a step 401, whether the photomagnetic disk 81 when photographing and recording are effected at one time is loaded on the photomagnetic disk drive 82 is confirmed, and if the photomagnetic disk is not loaded, the photomagnetic disk 81 is inserted (step 402).

At a step 403, the disk number of the inserted photomagnetic disk 81 is transmitted to the apparatus body 11, which acknowledges the disk number.

When, at a step 404, instructions for starting the photographing and recording of the image are given, the combination of the disk number of the photomagnetic disk 81 and microfilm No. is researched (step 405). The CPU 204 of the apparatus body judges whether the combination of the transmitted film No. and disk number coincides with the corresponding data of the memory portion 205.

If the transmitted disk number is a disk number corresponding to film No. 1, that is, if the disk number is 1, the photographing and recording of the image can be started (step 406).

If the disk number differs from the combination, the alarm display to that effect is displayed on the display 128 of the control portion 126 (step 407), the wrong disk is discharged from the photomagnetic disk drive 82 (step 408), and the insertion of a correct disk (disk number 1) is called for and the photographing and recording of the image are prohibited (step 409).

In this first embodiment, the microfilm F on which the image is photographed simultaneously with digital recording is not limited to a roll, but as shown in FIG. 13, two or more rolls of film may be combined.

Second Embodiment (FIGS. 14 to 18)

This second embodiment is one in which each of a plurality of camera units 35 loaded with microfilm F has an identification number ID attached thereto and an effect similar to that of the first embodiment is created even when a removably mountable camera unit 35 is used.

Figure 14:
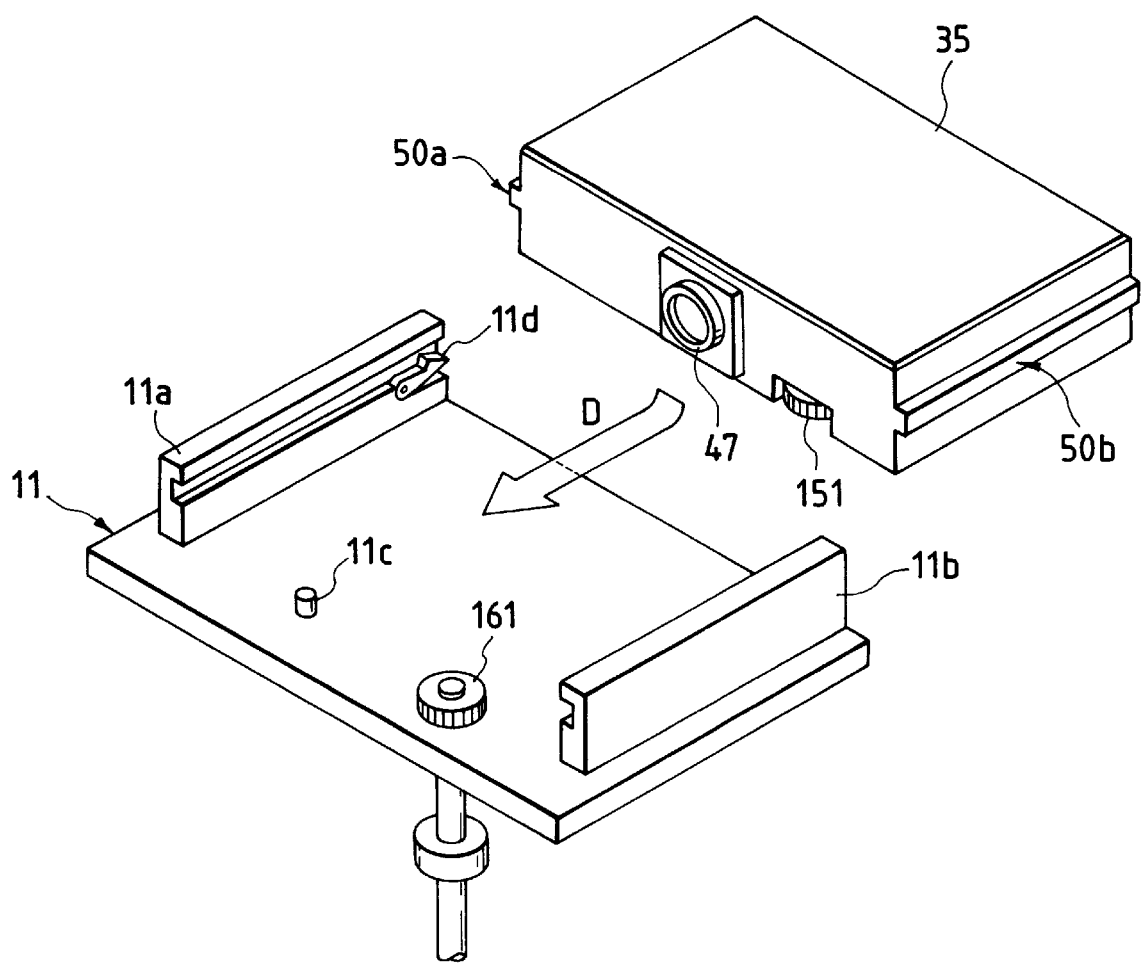
FIG. 14 is a schematic perspective view of a holding device for a camera unit in a second embodiment of the present invention.

FIG. 14 shows an example of a holding device for removably holding the camera unit.

When first and second slide portions 50a and 50b formed on the opposite sides of the case of the camera unit 35 are engaged with first and second rails 11a and 11b formed on the apparatus body 11 and are slidden and the camera unit bears against a positioning pin 11c, it comes into engagement with a lock pawl 11a provided on the first rail 11a, whereby the camera unit 35 is removably mountable on the apparatus body 11.

Further, as a camera driving system, a camera connecting gear 151 for transmitting the drive from a body driving system is provided outside the camera unit 35, and this camera connecting gear 151 comes into meshing engagement with a drive gear 161 on the body side and is drivingly coupled thereto when the camera unit 35 is mounted at a predetermined location on the apparatus body 11. The drive gear 161 is coupled to a film driving motor in the apparatus body, and the microfilm in the camera unit 35 is conveyed through the intermediary of the drive gear 161 and the connecting gear 151.

The plurality of camera units removably mounted have the same construction, and as inherent identification information, the camera unit No. is stored in each of them, and when a camera unit is loaded, the unit No. of this camera unit may be transmitted to the apparatus body.

Figure 15:
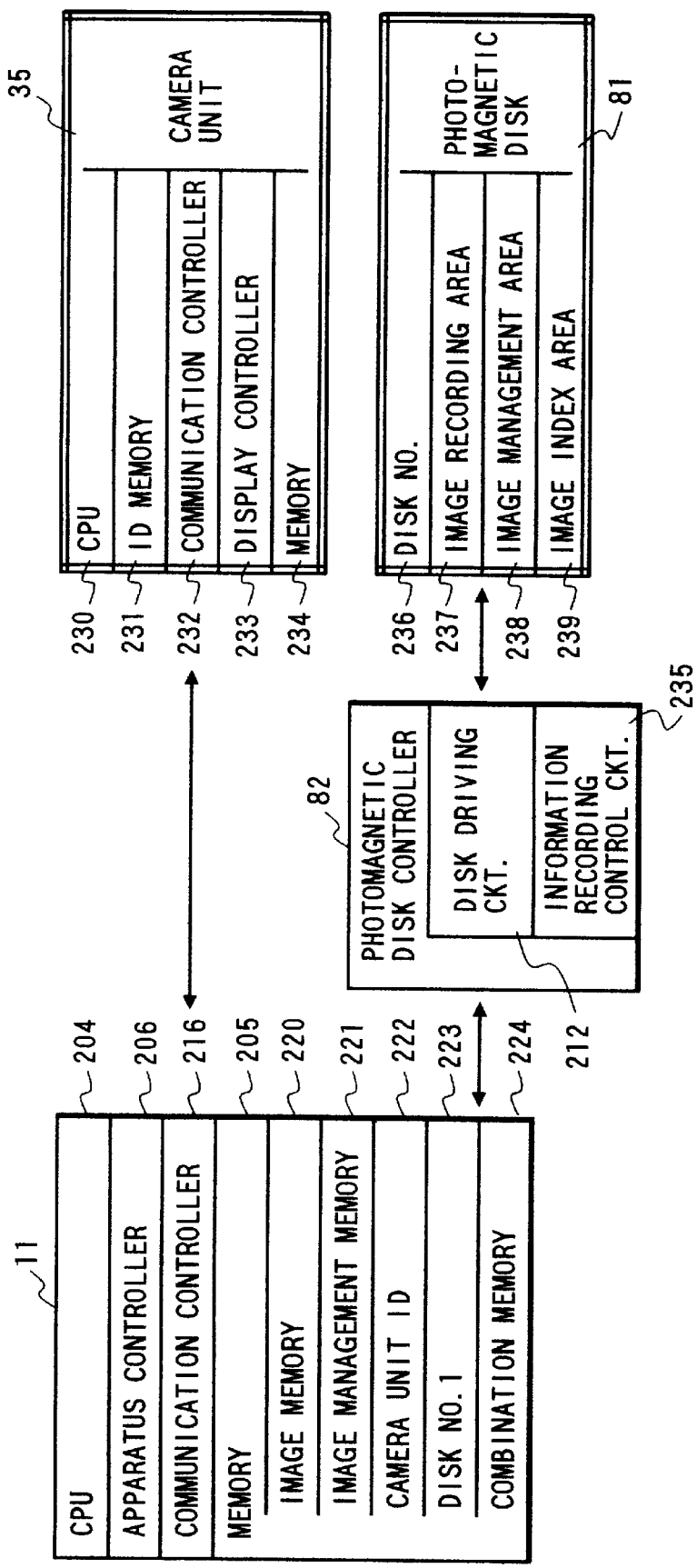
FIG. 15 is a block diagram of a control system in the second embodiment.

FIG. 15 is a block diagram representing a construction for specifying the mounted camera unit 35 and photomagnetic disk 81 on the image recording apparatus body 11 side.

The reference numeral 204 designates the CPU of the image recording apparatus body 11 side, and in the CPU 204, there are an apparatus controller 206, a communication controller 216 with the outside, and a memory portion 205, in which there are a memory 220 for storing the image therein, a memory 221 for storing image management information therein, a memory 222 for storing the identification number ID of the mounted camera unit 35 therein, a memory 223 for storing the disk number of the mounted photomagnetic disk 81 therein, and a memory 224 for storing therein the combination data of camera unit No. and disk number when photographing and recording are effected at one time.

The camera unit 35 has therein a CPU 230, an ID memory 231 for storing the identification number ID of each individual camera unit therein, a communication controller 232 for effecting the exchanges of information with the CPU 204 of the image recording apparatus body 11 side, a display controller 233 and a memory portion 234.

In the memory area of the photomagnetic disk 81, there are a memory 236 for storing disk numbers therein, an area 237 for storing the image therein, an image management area 238 for storing the management information of the image therein, and an image index area 239 used when the image is searched, and when the CPU 204 of the image recording apparatus body 11 side records on the photomagnetic disk 81, it is necessary to go via a photomagnetic disk controller 82 including a disk driving circuit 212 and an information recording control circuit 235.

As shown in FIG. 15, a design is made such that the identification number ID can be stored in each of a plurality of camera units 35 removably used in the image recording apparatus body 11 and therefore, the image recording apparatus body 11 can specify the mounted camera unit 35.

FIG. 16 shows examples of the combination. The photomagnetic disk 81 has disk numbers attached to it, and there are disk numbers 2, 5 and 7. The identification number IDs of the camera unit are 1, 2 and 3.

As combination 1, disk number 2 and camera unit ID1 are photographed and recorded at one time without fail, and likewise, as combination 2, disk number 5 and camera unit ID2 are stored, and as combination 3, disk number 7 and camera unit ID3 are stored.

Figure 17:
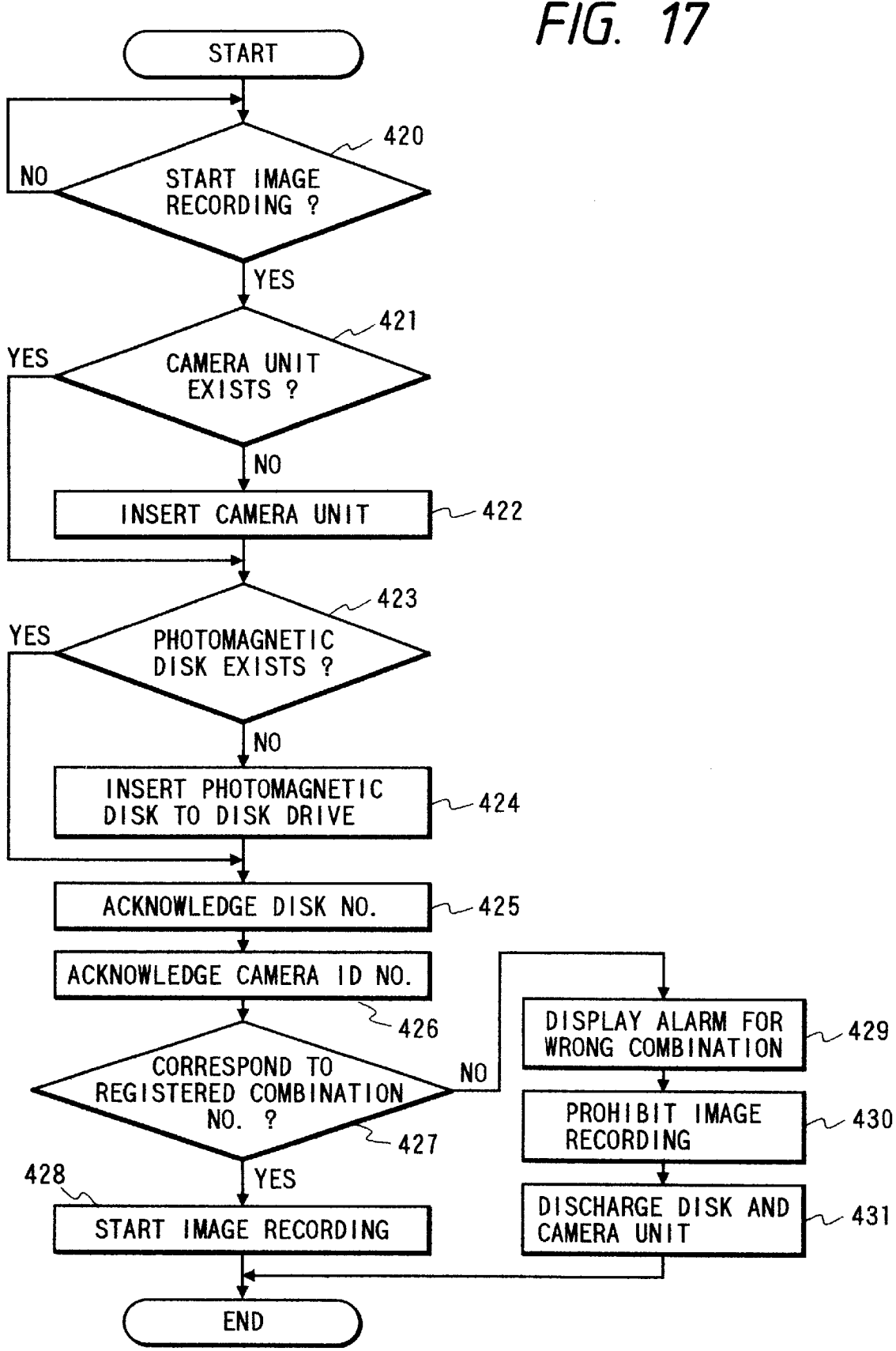
FIG. 17 is a control flow chart.

An example when in the case of such combinations, photographing and recording are effected on the film F and on the photomagnetic disk 81 at one time will now be described with reference to the flow chart of FIG. 17.

When at a step 420, the photographing and recording of the image are started, it is first confirmed that the camera unit 35 is mounted on the image recording apparatus body 11 (step 421). If the camera unit does not exist, the camera unit 35 is inserted (step 422).

Next, whether the photomagnetic disk 81 is in the photomagnetic disk drive 82 is confirmed (step 423). If it does not exist, the photomagnetic disk 81 is inserted into the photomagnetic disk drive 82 (step 424).

Next, the image recording apparatus body 11 acknowledges the mounted disk number and camera unit ID (steps 425 and 426), and whether they correspond to one of the combinations registered in FIG. 13 is judged (step 427).

If they correspond to the combination, the photographing and recording of the image are started (step 428).

If the combination of the disk number and camera unit ID acknowledged at the steps 425 and 426 does not correspond to the substance of the stored corresponding data, the alarm that the combination is wrong is displayed on the display 128 of the control portion 126 (step 429), and the photographing and recording of the image are prohibited (step 430), and the photomagnetic disk 81 and the camera unit 38 are discharged (step 431).

In this second embodiment, the number of camera units for the microfilm on which photographing and recording are effected simultaneously with the digital recording of image information is not limited to one, but as shown in FIG. 18, two or more camera unit IDs may be combined.

FIG. 18 shows the combination of the photomagnetic disk of disk number 2 and the microfilm of camera units ID1 and ID2 as combination 1, the combination of disk number 5 and camera units ID3 and ID4 as combination 2, and the combination of disk number 7 and camera units ID5 and ID6 as combination 3.

Figure 19:
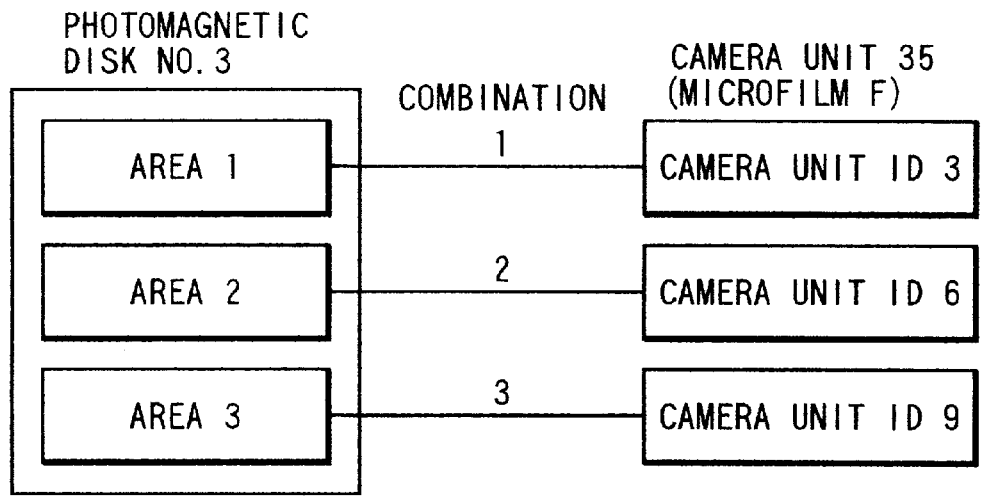
FIG. 19 shows examples of the combination of a photomagnetic disk and a camera unit (microfilm) in a third embodiment of the present invention.
Figure 20:
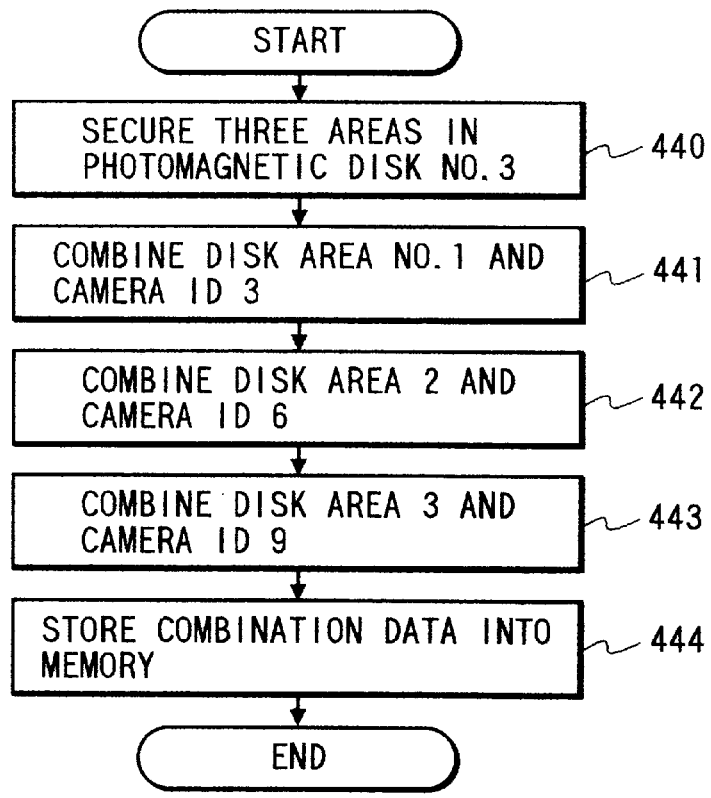
FIG. 20 is a control flow chart (1).
Figure 21:
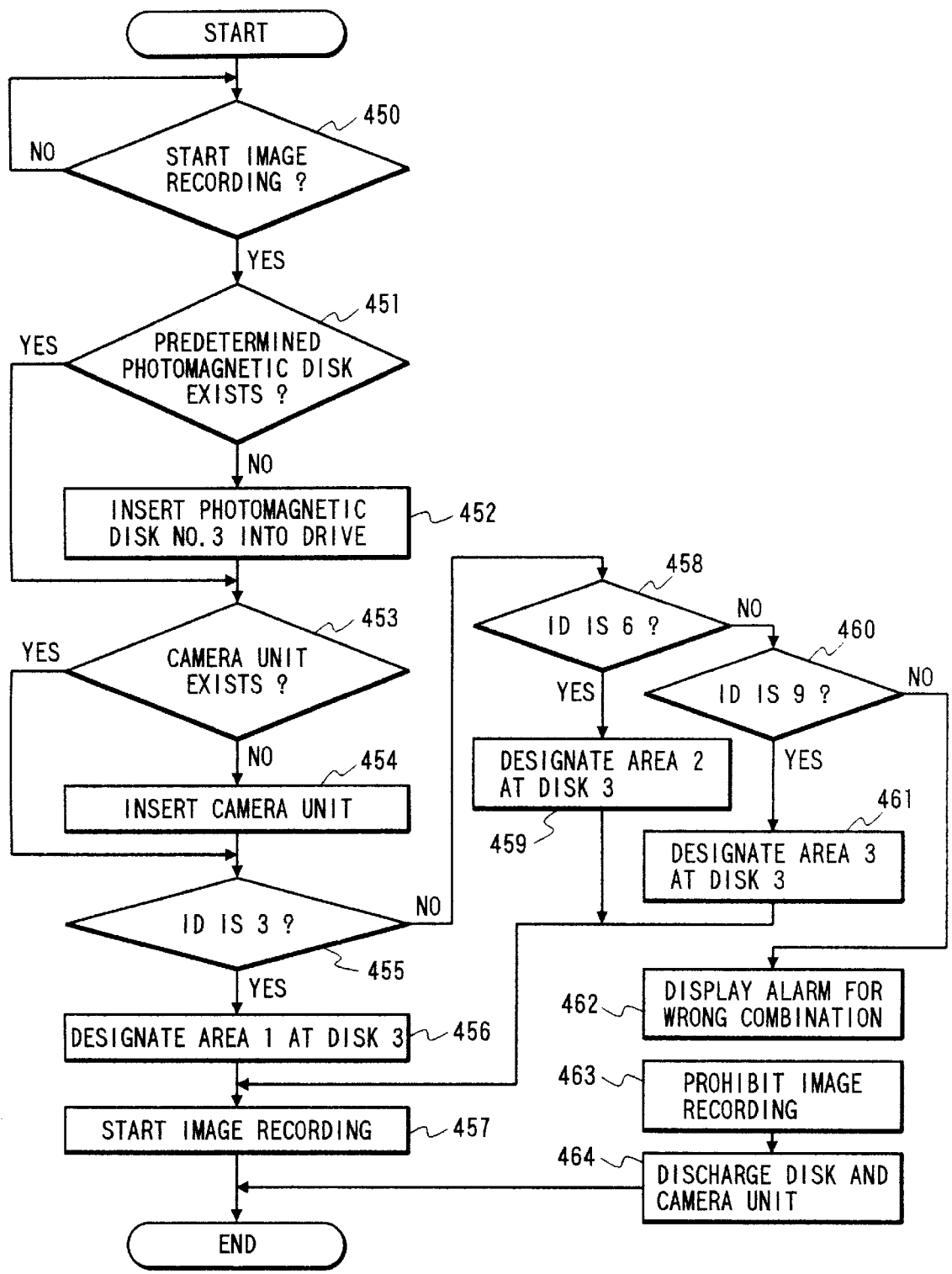
FIG. 21 is a control flow chart (2).

Third Embodiment (FIGS. 19 to 21)

In this third embodiment, there is shown an example in which when the image recording capacity of the photomagnetic disk 81 is much greater relative to the image photographing capacity of the microfilm F, the recording area of the photomagnetic disk 81 is divided into a plurality of areas, which are combined with a plurality of camera units.

FIG. 19 shows examples of the combination. The recording area of disk number 3 of the photomagnetic disk 81 is divided into three areas (areas 1, 2 and 3), each of which has a storing capacity corresponding to a roll of microfilm. There are camera units ID3, 6 and 9, and there are combinations 1 to 3.

Describing this with reference to the flow chart of FIG. 20, at a step 440, recording areas corresponding to three rolls of film are first secured in photomagnetic disk number 3, and they are defined as recording areas 1, 2 and 3.

In accordance with the camera unit ID, at a step 441, disk number 3—area 1 and camera unit ID3 are combined and defined as combination 1.

Likewise, at a step 442, disk number 3—area 2 and camera unit ID6 are combined and defined as combination 2, and at a step 443, disk number 3—area 3 and camera unit ID9 are combined and defined as combination 3.

At a step 444, all combinations are stored in the combination memory portion 224.

An example when in the case of such combinations, photographing and recording are effected on the camera unit and the photomagnetic disk 81 at one time will now be described with reference to the flow chart of FIG. 21.

When, at a step 450, the photographing and recording of the image are started, whether a predetermined photomagnetic disk 81 is mounted is first confirmed (step 451), and if disk number 3 is not mounted, at a step 452, photomagnetic disk number 3 is inserted into the photomagnetic disk drive 82 (step 452).

Next, when the camera unit is mounted (step 453), the camera unit 38 is inserted (step 454) and the ID thereof is confirmed.

If camera unit ID is 3 (step 455), the recording area 1 of disk number 3 is designated in accordance with the combination of FIG. 19 (step 456), and the photographing and recording of the image are started (step 457).

If the camera unit ID is 6 (step 458), the recording area 2 of disk number 3 is designated in accordance with the combination of FIG. 19 (step 459), and the photographing and recording of the image are started (step 457).

If the camera unit ID is 9 (step 460), the recording area 3 of disk number 3 is designated in accordance with the combination of FIG. 19 (step 461), and the photographing and recording of the image are started (step 457).

If the camera unit ID is not in the combinations, the alarm that the combination is wrong is displayed on the display 128 of the control portion 126 (step 462), the photographing and recording of the image are prohibited (step 463) and the photomagnetic disk 81 and the camera unit 35 are discharged (step 464).

Figure 22:
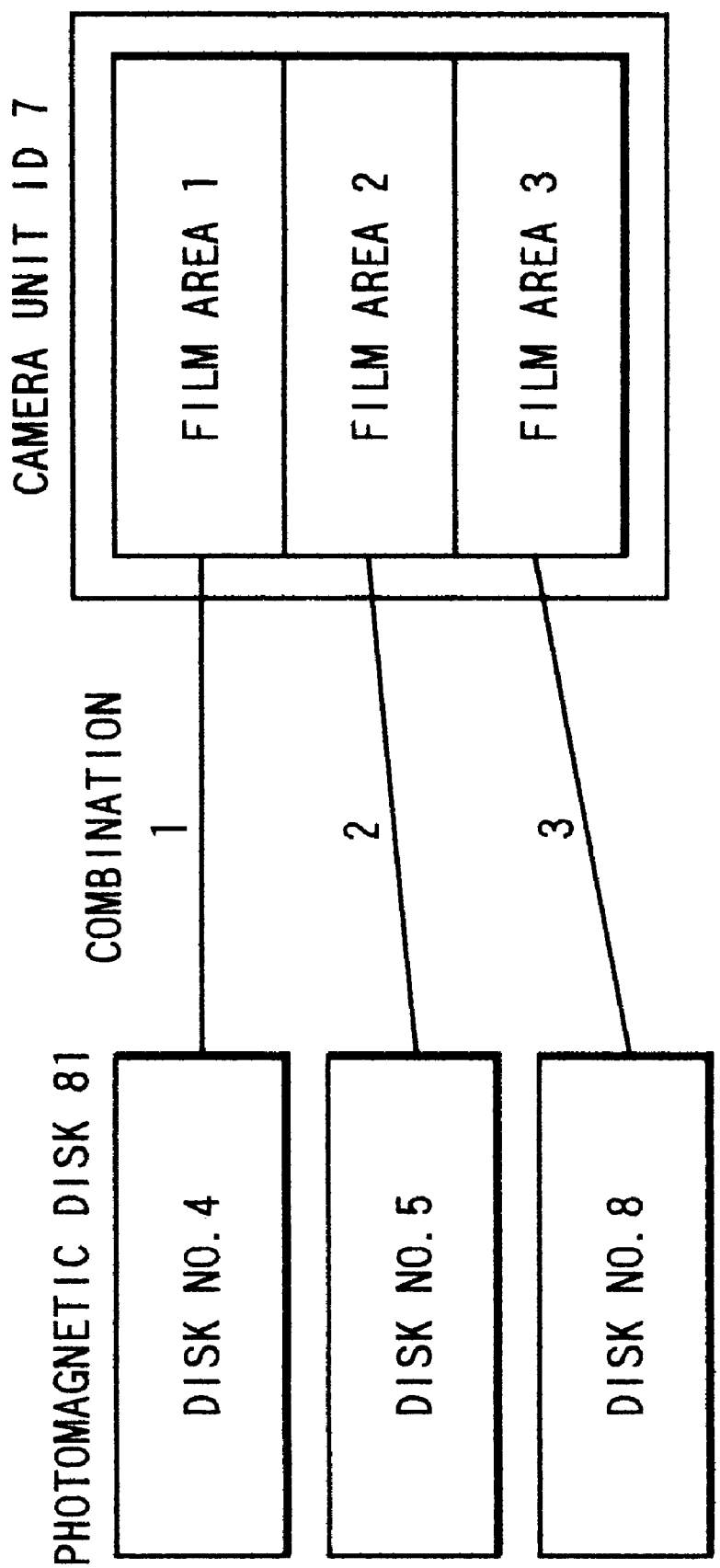
FIG. 22 shows examples of the combination of a photomagnetic disk and a camera unit (microfilm) in a fourth embodiment of the present invention.
Figure 23:
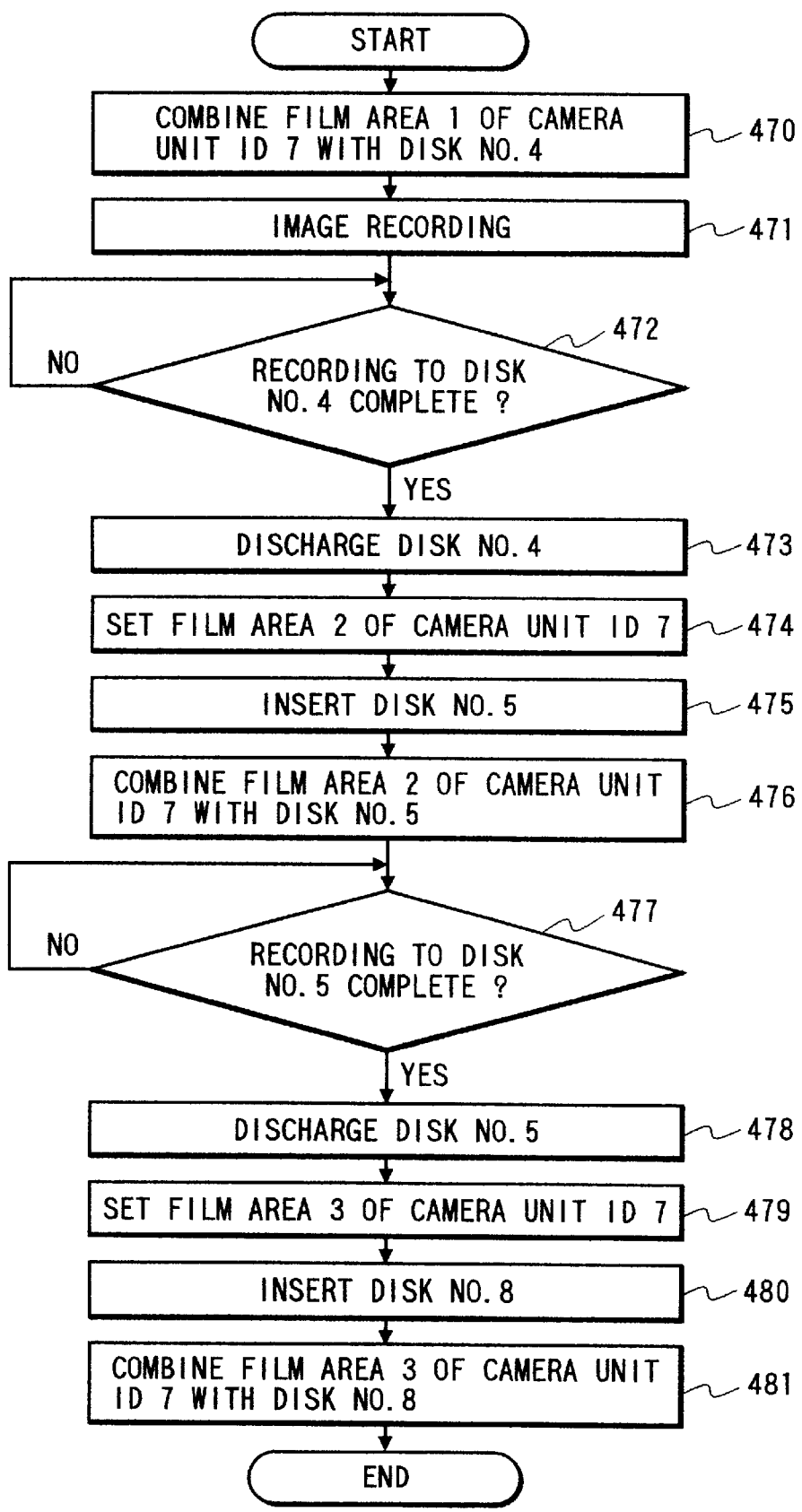
FIG. 23 is a control flow chart.

Fourth Embodiment (FIGS. 22 and 23)

This fourth embodiment, conversely to the above-described third embodiment, shows an example in which when the image photographing capacity of the microfilm F is much greater relative to the image recording capacity of the photomagnetic disk 81, the image photographing area of the microfilm F is divided into a plurality of areas, which are combined with a plurality of photomagnetic disks.

FIG. 22 shows examples of the combination. The microfilm in the camera unit ID7 is divided into three areas (film areas 1, 2 and 3) in accordance with disk numbers 4, 5 and 8, and disk number 4 is combined with the film area 1, disk number 5 is combined with the film area 2, and disk number 8 is combined with the film area 3 (combinations 1 to 3).

The flow of these combinations will hereinafter be described with reference to the flow chart of FIG. 23. When photographing and recording are to be first started, at a step 470, camera unit ID7 and disk number 4 are combined and the photographing and recording of the image are started (step 471).

When the photographing and recording of the image progress and the recording on disk number 4 is completed (step 472), disk number 4 is discharged from the photomagnetic disk drive 82 (step 473).

Next, the film range of camera unit ID7 is changed over to 2 (step 474), and photomagnetic disk number 5 is inserted into the photomagnetic disk drive 82 (step 475) and the combination of the film area 2 of camera unit ID7 and disk number 5 is made (step 476).

When the photographing and recording of the image further progress and the recording on disk number 5 is completed (step 477), disk number 5 is discharged from the photomagnetic disk drive 82 (step 478).

Next, the film area of camera unit ID7 is changed over to 3 (step 479), and photomagnetic disk number 8 is inserted into the photomagnetic disk drive 82 (step 480) and the combination of the film area 3 of camera unit ID7 and disk number 8 is made (step 481).

Although not expressed in the flow chart of FIG. 23, similar to the aforedescribed embodiments, of course, an alarm is given or photographing and recording are prohibited when there is created a wrong combination in the course of photographing.

A design may be made such that when at this time, a recording medium is inserted and the state of a correct combination is restored, an alarm is automatically discontinued and the photographing and recording prohibiting state is released.

Others

1) The image recording apparatus body 11 in each of the above-described embodiments has the function of effecting only photographing and only digital recording and therefore, even if the partner of a combination does not exist, it is also possible to change over so that photographing or recording can be done singly.
2) In each of the above-described embodiments, the photomagnetic disk 81 has been taken up as a digital recording medium, whereas it may be replaced, for example, by a medium such as a hard disk, CD-ROM or a digital recording tape.
3) Chiefly the combination of a roll of microfilm and a disk has been mentioned as an example, but when a plurality of rolls of microfilm and a plurality of disks can be mounted on the image recording apparatus body 11, the combination of the plurality of rolls of microfilm and the plurality of photomagnetic disks may be made.

By the construction as described above, when the microfilm F or the camera unit 35 and a part or the whole of the photomagnetic disk 81 are combined with each other and photographing and recording in the other state than the combination are prohibited to thereby record the image on the photomagnetic disk 81 and at the same time, photograph the image on the microfilm F as the back-up for preservation, there does not arise the problem that recording is effected on a different disk and film by mistake or recording is effected on only the disk or only the film and thus, complete back-up for preservation can be prepared.

As described above, according to the present invention, a photographing medium and a digital recording medium are related to each other, that is, a photographing medium and a digital recording medium are combined while being made to correspond to each other, and any other combination than this is excluded, whereby an image photographed on the photographing medium and an image recorded on the digital recording medium can be made completely coincident with each other, and this leads to the effect that a preservation medium (back-up) by the photographing medium can be prepared.

Particularly, when the photographing reduction rate of photographing on a photographing medium is small or great and when the image recording capacities (the number of recordable images) of a digital recording medium and a photographing medium differ greatly from each other, and when several photographing mediums correspond to a digital recording medium or conversely, several digital recording mediums correspond to a photographing medium, there is the effect that an image can be photographed and recorded without the combination of the mediums becoming cumbersome and without the combination being mistaken.

In the above-described embodiments, the same original is recorded on the microfilm and the photomagnetic disk substantially at one time, but alternatively, the same original may be sequentially recorded. For example, along the conveyance path of the original, the camera unit and the image pickup portion are disposed in the direction of conveyance, and after the same original is photographed by the camera unit, the original is picked up by the image pickup portion, whereby the image can be recorded on the microfilm, and then this image can be recorded on the photomagnetic disk.

What is claimed is:

1. An image recording apparatus comprising:

first recording means for recording an image of an original on a first recording medium, wherein identification information is imparted to the first recording medium;

second recording means for recording the image of the original on a second recording medium, wherein identification information is imparted to the second recording medium;

holding means for removably holding the first recording medium and the second recording medium on a body of said apparatus;

memory means for storing a combination of the identification information of the first recording medium and the second recording medium, on which a related image is to be recorded; and means for discriminating whether the combination of the identification information of the first recording medium and the second recording medium mounted on said holding means coincides with the combination of identification information stored in said memory means, to control motion of said first recording means and said second recording means, on the basis of the result of the discrimination.

2. An image recording apparatus according to claim 1, wherein, when the combination of the identification information of the first recording medium and the second recording medium mounted on said holding means coincides with the combination of the identification information stored in said memory means, the recording of an image is permitted, and when the combination of the identification information of the first recording medium and the second recording medium do not coincide with the combination of the identification information stored in said memory means, the recording of an image is prohibited.

3. An image recording apparatus according to claim 1, wherein said first recording means and said second recording means record the same original on the first recording medium and on the second recording medium, on which the combined identification information is imparted.

4. An image recording apparatus according to claim 1, wherein at least one of the identification information of the first recording medium and at least one of the identification information of the second recording medium are combined to be stored in said memory means.

5. An image recording apparatus according to claim 4, wherein said first recording means effects recording by exposing the image of the original on the first recording medium.

6. An image recording apparatus according to claim 5, wherein the first recording medium is microfilm.

7. An image recording apparatus according to claim 5, wherein said second recording means reads the image of the original and converts it into an image signal, and records the signal on the second recording medium.

8. An image recording apparatus according to claim 7, wherein said second recording means comprises means for reading the image and converting it into an electrical signal.

9. An image recording apparatus according to claim 7, wherein the second recording medium is a photomagnetic disk.

10. An image recording apparatus according to claim 1, further comprising a case for containing the first recording medium, wherein said case includes identification information corresponding to the first recording medium contained therein, and is removably mountable on said holding means.

11. An image recording apparatus according to claim 1, further comprising comparing means for reading the identification information of the first recording medium and the second recording medium mounted on said holding means, to compare the combination of the identification information read and the combination of the identification information stored in said memory means.

12. An image recording apparatus according to claim 11, wherein, when the combinations of the identification information compared by said comparing means do not coincide with each other, recording of the image is prohibited.

13. An image recording apparatus according to claim 11, wherein said first recording means and said second recording means record the same original substantially at the same time.

14. An image recording apparatus according to claim 1, wherein the first recording medium is contained in a camera unit that includes a photo-taking lens, and one of a plurality of camera units is selectively mounted on said holding means, each of the camera units including identification information.

15. An image recording apparatus according to claim 14, wherein the first recording medium is photographic film.

16. An image recording apparatus according to claim 14, wherein said camera unit includes a memory storing the identification information therein.

17. An image recording apparatus according to claim 14, wherein said second recording means comprises means for reading the image of the original and converting it into an electrical signal, and means for converting the signal into a digital signal and recording the digital signal on the second recording medium.

18. An image recording apparatus according to claim 17, wherein the second recording medium is a photomagnetic disk.

19. An image recording apparatus comprising:

first recording means for recording the image of an original on a first recording medium, wherein identification information is imparted to the first recording medium;

second recording means for recording the image of the original on a second recording medium, wherein identification information is imparted to the second recording medium;

holding means for removably holding the first recording medium and the second recording medium on a body of said apparatus;

memory means for storing a combination of the identification information of the first recording medium and the second recording medium, on which a related image is to be recorded;

discriminating means for discriminating whether the combination of the identification information of the first recording medium and the second recording medium mounted on said holding means coincides with the combination of the identification information stored in said memory means; and recording control means for starting recording when said discriminating means discriminates that the combination of the identification information of the first recording medium and the second recording medium coincides with the combination of the identification information stored in said memory means, and for prohibiting recording when said discriminating means does not discriminate that the combination of the identification information of the first recording medium and the second recording medium coincides with the combination of the identification information stored in said memory means.

20. An image recording apparatus according to claim 19, further comprising means for issuing a warning when said discriminating means does not discriminate that the combination of the identification information of the first recording medium and the second recording medium coincide with the combination of the identification information stored in said memory means.

21. An image recording apparatus according to claim 19, wherein, when said discriminating means does not discriminate that the combination of the identification information of the first recording medium and the second recording medium coincide with the combination of the identification information stored in said memory means, one of the recording mediums mounted on said holding means is discharged from said holding means.

22. An image recording apparatus according to claim 19, wherein, when said discriminating means discriminates that the combination of the identification information of the first recording medium and the second recording medium coincide with the combination of the identification information stored in said memory means, the same original is recorded on the first recording medium and the second recording medium mounted on said holding means.

23. An image recording apparatus according to claim 19, wherein said first recording means exposes the image of the original on the first recording medium to thereby effect recording.

24. An image recording apparatus according to claim 23, wherein the first recording medium is microfilm.

25. An image recording apparatus according to claim 19, wherein said second recording means reads the image of the original and converts the image into an image signal, and records the signal on the second recording medium.

26. An image recording apparatus according to claim 25, wherein said second recording means comprises means for reading the image and converting it into an electrical signal.

27. An image recording apparatus comprising:
   first recording means for recording an image on a first recording medium, which is removably mounted on a body of said apparatus, wherein identification information is imparted to the first recording medium;
   second recording means for recording the image on a second recording medium, which is removably mounted on the body of said apparatus, wherein identification information is imparted to the second recording medium;
   memory means for storing a combination of the identification information of the first recording medium and the second recording medium, which are related to each other; and
   means for discriminating whether the combination of the identification information of the first recording medium and the second recording medium mounted on the main body of said apparatus coincides with the combination of the identification information stored in said memory means, to control starting and prohibiting of recording of an image on a basis of the result of the discrimination.

28. An image recording apparatus according to claim 27, wherein the first recording medium is removably held on a camera unit, which is removably mountable on the body of said apparatus.

29. An image recording apparatus according to claim 28, further comprising an optical system for projecting the image onto the first recording medium of the camera unit mounted on the body of said apparatus.

30. An image recording apparatus according to claim 29, wherein the first recording medium is photographic film.

31. An image recording apparatus according to claim 27, wherein said second recording means comprises an image sensor for reading the image and converting it into an electrical signal, and means for converting the output of the image sensor into a digital signal and recording the digital signal on the second recording medium.

32. An image recording apparatus according to claim 31, wherein the second recording medium is a photomagnetic disk.

* * * * *

UNITED STATES PATENT AND TRADEMARK OFFICE
CERTIFICATE OF CORRECTION

PATENT NO. : 5,926,256

DATED : July 20, 1999

INVENTOR(S): MASASHI YAHARA

It is certified that error appears in the above-identified patent and that said Letters Patent is hereby corrected as shown below:

COLUMN 1,
Line 47, "the" should read --one--.

COLUMN 2,
Line 16, "function" should read --function,--.

COLUMN 4,
Line 11, "its both" should read --both its-- and "are" should read --one--.

COLUMN 5,
Line 55, "interchangeable" should read --interchangeable,--.

COLUMN 11,
Line 66, "Chiefly" should read --Chiefly,--.

Signed and Sealed this

Eighteenth Day of April, 2000

Attest:

Q. TODD DICKINSON

Attesting Officer  Director of Patents and Trademarks